United States Patent
Ahn et al.

(10) Patent No.: US 7,560,190 B2
(45) Date of Patent: Jul. 14, 2009

(54) COOLING SYSTEM FOR BATTERY PACK

(75) Inventors: Jaesung Ahn, Nam-gu Busan (KR); Hyosang Woo, Daejeon (KR); Do Yang Jung, Hwaseong-si (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 663 days.

(21) Appl. No.: 11/259,461

(22) Filed: Oct. 26, 2005

(65) Prior Publication Data
US 2006/0090492 A1    May 4, 2006

(30) Foreign Application Priority Data
Oct. 26, 2004    (KR)   ............ 10-2004-0085765

(51) Int. Cl.
*H01M 10/50*   (2006.01)
(52) U.S. Cl. ........................... 429/120; 429/79
(58) Field of Classification Search ........... 429/120, 429/72
See application file for complete search history.

(56) References Cited

U.S. PATENT DOCUMENTS

| 5,589,290 | A | 12/1996 | Klink et al. |
| 6,783,886 | B1 * | 8/2004 | Sakakibara et al. ........... 429/99 |
| 7,014,949 | B2 * | 3/2006 | Kanai et al. ................. 429/148 |

FOREIGN PATENT DOCUMENTS

KR    10-2004-0045937    6/2004

* cited by examiner

*Primary Examiner*—Mark Ruthkosky
(74) *Attorney, Agent, or Firm*—Cantor Colburn LLP

(57) ABSTRACT

Disclosed herein is a cooling system for a battery pack that is usable as a power source of electric vehicles and hybrid-electric vehicles. The cooling system has the effect of effectively dissipating heat generated from battery cells by supplying a refrigerant to the battery cells at a constant flow rate, and of minimizing a temperature difference between the battery cells during a cooling process. This prevents degradation in the performance of the battery cells, and achieves optimal temperature control. Also, the cooling system employs a single refrigerant guide member arranged at a side of the battery pack, resulting in a reduction in the size of an overall battery system.

7 Claims, 3 Drawing Sheets

COOLING SYSTEM FOR BATTERY PACK

FIELD OF THE INVENTION

The present invention relates to a cooling system for a battery pack that is usable as a power source of electric vehicles and hybrid-electric vehicles, and, more particularly, to a battery pack cooling system for controlling the temperature of a battery pack, in which a refrigerant introduction section and a refrigerant discharge section are located at the same side of the system and each of a plurality of battery modules has an independent refrigerant passage, whereby a refrigerant passes through a plurality of battery cells of the battery modules at a constant flow rate, resulting in a reduction in a temperature variation between the battery cells as well as the size of an overall battery system.

BACKGROUND OF THE INVENTION

One major problem with vehicles that burn fossil fuels, such as gasoline and diesel, is air pollution. To solve such a problem, drawing attention is a technology in which a rechargeable secondary battery is utilized as a power source of vehicles. Accordingly, electric vehicles (EV) that are operable merely by a secondary battery, and hybrid-electric vehicles (HEV) that use both a secondary battery and an internal combustion engine, have been developed, and some of them are commercialized. A representative example of the secondary battery, which is usable as a power source of EVs and HEVs, is a nickel-metal hybrid (Ni-MH) battery, but the use of lithium-ion batteries has also been tried recently.

To use the secondary battery as a power source of EVs and HEVs, the secondary battery must have a high output and capacity. Considering a conventional configuration to satisfy this requirement, a plurality of small secondary batteries (battery cells) is interconnected in series or in parallel to constitute a battery module, and in turn, a plurality of battery modules is interconnected in series or in parallel to constitute a single battery pack.

However, the high output and capacity secondary battery has a problem in that it generates a large amount of heat in a charge/discharge mode thereof. If the heat of battery cells generated in a charge/discharge mode is not effectively removed, the heat is accumulated, resulting in a degradation of the battery cells. For this reason, it is necessary to provide such a high output and capacity battery back with a cooling system.

As examples of a system for cooling a battery pack according to the prior art, U.S. Pat. No. 5,589,290 and Korean Patent Laid-Open Publication No. 2004-45937 can be referred. Now, the principle of a conventional system for cooling a battery pack will be explained with reference to FIG. 1.

As shown in FIG. 1, the conventional battery pack cooling system, designated as reference numeral 10, includes a battery pack 20 having a plurality of batteries, a refrigerant introduction section 30 arranged at a lower end surface of the battery pack 20, and a refrigerant discharge section 40 arranged at an upper end surface of the battery pack 20. The battery pack 20 consists of a plurality of battery modules 50 electrically connected to each other. Also, each of the battery modules 50 consists of a plurality of battery cells 60 electrically connected to each other. The battery cells 60 of each battery module 50 define slight gaps in contact regions of the neighboring battery cells 60, so that a refrigerant, introduced via the introduction section 30, is used to dissipate heat generated from the battery cells 60 while moving through the gaps. The used refrigerant, after that, is discharged via the discharge section 40 provided at the top of the battery pack 20.

However, the battery pack cooling system 10 having the above-described configuration as shown in FIG. 1 has several problems as follows.

Firstly, in the case of the conventional battery pack cooling system 10, it is difficult to uniformly distribute the refrigerant, having passed through the introduction section 30, into the respective battery modules 50. This inevitably results in a wide temperature difference between the battery cells 60. Recent researches confirm that such a wide temperature difference between the battery cells 60 is a main factor of degrading the overall performance of the battery pack 20.

Secondly, since the refrigerant introduction section 30 and the refrigerant discharge section 40 are independently arranged at the upper and lower sides of the battery pack 20, it is necessary to arrange two refrigerant guide members at both the upper and lower sides of the battery pack 20, respectively. This doubles a space for the installation of the refrigerant guide members, and thus, undesirably increases the size of an overall battery system.

For these reasons, most currently commercialized battery pack cooling systems are unable to provide optimal temperature control of battery cells, and suffer from an increase in the size of an overall battery system.

SUMMARY OF THE INVENTION

Therefore, the present invention has been made in view of the above problems and other conventional technical problems awaiting solution, and it is an object of the present invention to provide a cooling system for a battery pack, which can effectively remove heat generated from battery cells by supplying a refrigerant to the battery cells at a constant flow rate, and can minimize a temperature difference between the battery cells during a cooling process, thereby restricting degradation in the performance of the battery cells and enabling optimal temperature control of the batter cells.

It is another object of the present invention to provide a battery pack cooling system capable of carrying out a desired cooling operation while achieving a reduction in the size of an overall battery system.

In accordance with an aspect of the present invention, the above and other objects can be accomplished by the provision of a cooling system for a battery pack, wherein a refrigerant introduction section and a refrigerant discharge section are located at the same side of the battery pack, and each of the refrigerant introduction section and the refrigerant discharge section is internally divided into a plurality of refrigerant passages, so that a refrigerant, having passed through the refrigerant introduction section, is guided to a respective one of battery modules to cool the battery modules, and subsequently, is discharged via the refrigerant discharge section.

As described above, the battery pack consists of a plurality of the battery modules electrically connected to each other, and in turn, each of the battery modules consists of a plurality of small batteries, i.e. battery cells, electrically connected to each other. To obtain a desired battery output and capacity, preferably, a high-power and high-output battery, it is necessary to electrically interconnect the battery modules, more particularly, the battery cells in series or in parallel. The battery cells are freely selectable from among various rechargeable batteries without a specific limitation. For example, such a battery cell for use in the present invention is a secondary battery in which a cathode, an anode, a separator, and an electrolyte are contained in a sealed container in a chargeable/dischargeable manner. Preferably, examples of the battery cells according to the present invention include lithium ion secondary batteries, lithium ion polymer secondary batteries, or nickel metal hybrid batteries.

The battery cells define slight gaps, for use in the movement of the refrigerant, in contact regions between the neighboring battery cells. As occasion demands, the battery cells may be spaced apart from each other by a predetermined equal distance or different distances to ensure effective movement of the refrigerant. While moving through the gaps, the refrigerant acts to dissipate heat generated from the battery cells.

The refrigerant for use in the present invention is freely selectable from among various cooling fluids without a specific limitation. Preferably, the refrigerant is selected from among air and water, and more preferably, is air. When the refrigerant is air, for example, the refrigerant is forced by a separate device, such as a fan, to be introduced into the refrigerant introduction section of the cooling system according to the present invention.

The battery pack cooling system of the present invention has an effect of reducing the size of an overall battery system because both the refrigerant introduction section and the refrigerant discharge section are formed at the same side of the battery pack. Also, due to the fact that each of the battery modules is associated with a specific one of the refrigerant passages so that the battery modules are independently cooled, the refrigerant can move in the respective passages at a constant flow rate, and a temperature difference between the battery cells can be reduced during a cooling process.

The refrigerant passages may be associated with the battery modules in a one to one ratio by use of various methods. In a preferred embodiment, the refrigerant introduction section is internally provided with a plurality of partitions, which serve to separate a respective one of the battery modules from the other battery modules adjacent thereto, so that the refrigerant is introduced into the respective battery modules to cool the battery modules while circulating therethrough, and subsequently, is discharged from the respective battery modules. Preferably, the partitions are also provided in the refrigerant discharge section. In an exemplary configuration, the partitions, used to separate the refrigerant passages of the battery modules from each other, extend from an inlet formed at the refrigerant introduction section or a location in vicinity of the inlet from an outlet formed at the refrigerant discharge section or a location in vicinity of the outlet.

Both the refrigerant introduction section and the refrigerant discharge section may be defined in a refrigerant guide member, and the refrigerant guide member may be arranged at an upper or lower side, or a lateral side of the battery pack. As occasion demands, the refrigerant guide member may be located in the center of the battery pack, so that the battery modules are arranged at upper and lower sides of the refrigerant guide member, respectively. Preferably, the refrigerant guide member may be arranged at the upper or lower side of the battery pack.

In a preferred embodiment, both the refrigerant introduction section and the refrigerant discharge section are arranged at the upper side of the battery pack, and the refrigerant passages are configured such that the refrigerant, having passed through the inlet of the refrigerant introduction section, first moves in the direction of a first sidewall of the battery pack to move downward along the first sidewall, and then, moves toward a second sidewall of the battery pack opposite to the first sidewall by passing through the gaps defined between the neighboring battery cells to move upward along the second sidewall, and finally, is discharged via the outlet of the refrigerant discharge section.

Preferably, the battery pack cooling system according to the present invention may be used in a battery system as a power source of electric vehicles or hybrid electric vehicles, more particularly, hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

Figure 1:
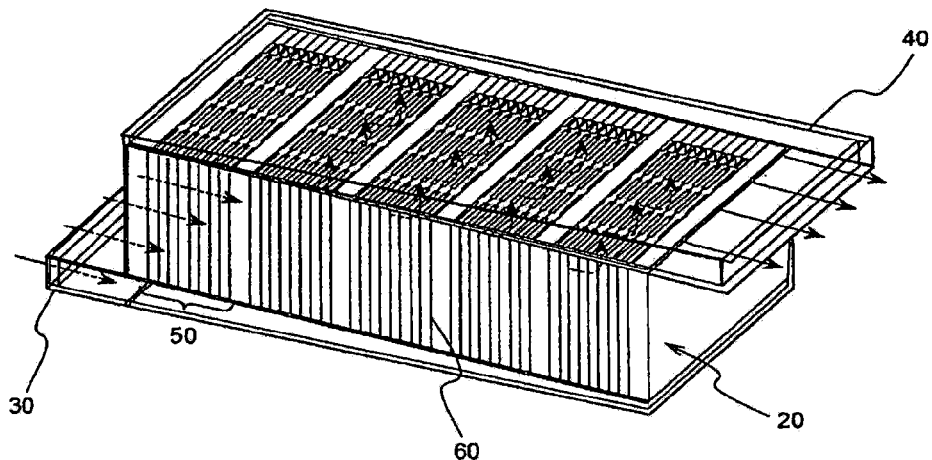
FIG. 1 is a diagram of a conventional battery pack cooling system, which is shown in partially cutaway view showing the interior.

| <Description of Main Reference Numerals of the Drawings> | | | |
|---|---|---|---|
| 100: | battery back cooling system | 200: | battery module |
| 300: | battery pack | 400: | battery cell |
| 500, 700: | refrigerant guide member | 600: | case |

DETAILED DESCRIPTION OF PREFERRED EMBODIMENTS

Hereinafter, a system for cooling a battery pack according to an embodiment of the present invention will be described with reference to the accompanying drawings. The following description is for the sake of easy understanding of the present invention, and is not intended to limit the scope of the present invention.

Figure 2:
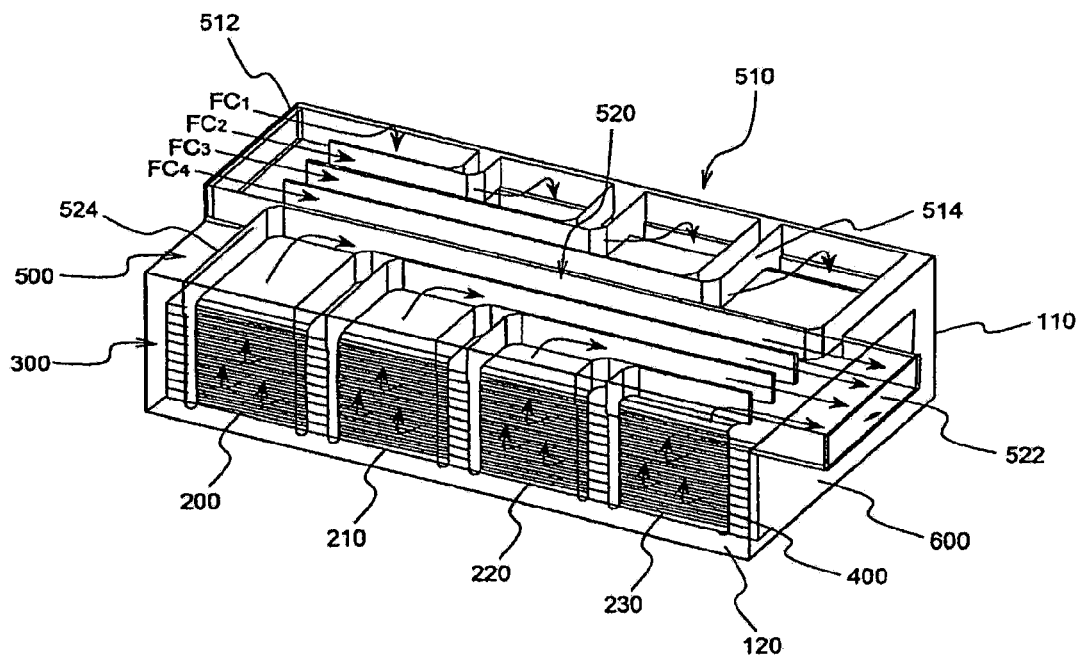
FIG. 2 is a diagram of a battery pack cooling system according to a preferred embodiment of the present invention.

FIG. 2 is a diagram of a battery pack cooling system according to the present invention, which is shown in partially cutaway view showing the interior. Referring to FIG. 2, the battery pack cooling system 100 includes a battery pack 300 consisting of a plurality of battery modules 200, 210, 220, and 230 electrically connected to each other, and a refrigerant guide member 500 arranged at an upper end surface of the battery pack 300. Each of the battery modules 200, 210, 220, and 230 includes a plurality of battery cells 400 electrically connected to each other.

The refrigerant guide member 500 includes a refrigerant introduction section 510 and a refrigerant discharge section 520. In the present invention, both the refrigerant introduction section 510 and the refrigerant discharge section 520 are located at the top of the battery pack 300. The introduction section 510 includes an inlet 512 to introduce a refrigerant, supplied from an exterior refrigerant supply device (not shown), into a sealed interior space of the cooling system 100, and a plurality of partitions 514 to divide the introduction section 510 into a plurality of refrigerant passages extending to the battery modules 200, 210, 220, and 230, respectively.

The discharge section 520 includes a plurality of partitions 524 to divide the discharge section 520 into a plurality of refrigerant passages, along which a relatively high-temperature refrigerant, having passed through the respective battery modules 200, 210, 220, and 230, moves, and an outlet 522 to discharge the high-temperature refrigerant to the outside of the cooling system 100.

The cooling system 100 is hermetically enclosed by a case 600 except for the inlet 512 and the outlet 522, so that the refrigerant moves only along the passages without risk of dispersion.

With the above-described configuration, after being introduced via the inlet 512, the refrigerant moves along the predetermined passages divided by the partitions 514, so that it has a constant flow rate per the respective passages. That is, the flow rate of the refrigerant passing through a specific one of the passages $FC_1$ that extends to a first of the battery modules 200, the flow rate of the refrigerant passing through a specific one of the passages $FC_2$ that extends to a second of the battery modules 210, the flow rate of the refrigerant passing through a specific one of the passages $FC_3$ that extends to a third of the battery modules 220, and the flow rate of the refrigerant passing through a specific one of the passages $FC_4$ that extends to a fourth of the battery modules 230 are identical to one another. The partitions 514 of the introduction section 510 are extended downward along a first sidewall 110 to the lower end surface of the battery pack 300. Accordingly, after being introduced via the inlet 512, the refrigerant first moves in the direction of the first sidewall 110, and subsequently, moves toward a second sidewall 120 opposite to the first sidewall 110 by passing through gaps defined between the neighboring battery cells 400. Here, since the respective battery modules 200, 210, 220, and 230 are isolated from each other, there is no risk that the refrigerant for use in the cooling of a specific one of the battery modules, for example, the battery module 200, invades the other battery module, for example, the battery module 210, when it moves from the first sidewall 110 to the second sidewall 120. As the refrigerant moves from the first sidewall 110 to the second sidewall 120, heat generated from the battery cells 400 is transferred to the refrigerant.

After reaching the second sidewall 120, the refrigerant moves upward into the discharge section 520 along the respective passages divided by the partitions 524, so that it is discharged to the outside of the system 100 via the outlet 522. When the refrigerant moves upward along the second sidewall 120, there is no variation in the flow rate of the refrigerant passing through the battery cells 400. For this reason, it may be considered that the partitions 524 of the discharge section 520 are formed only at the second sidewall 120.

Figure 3:
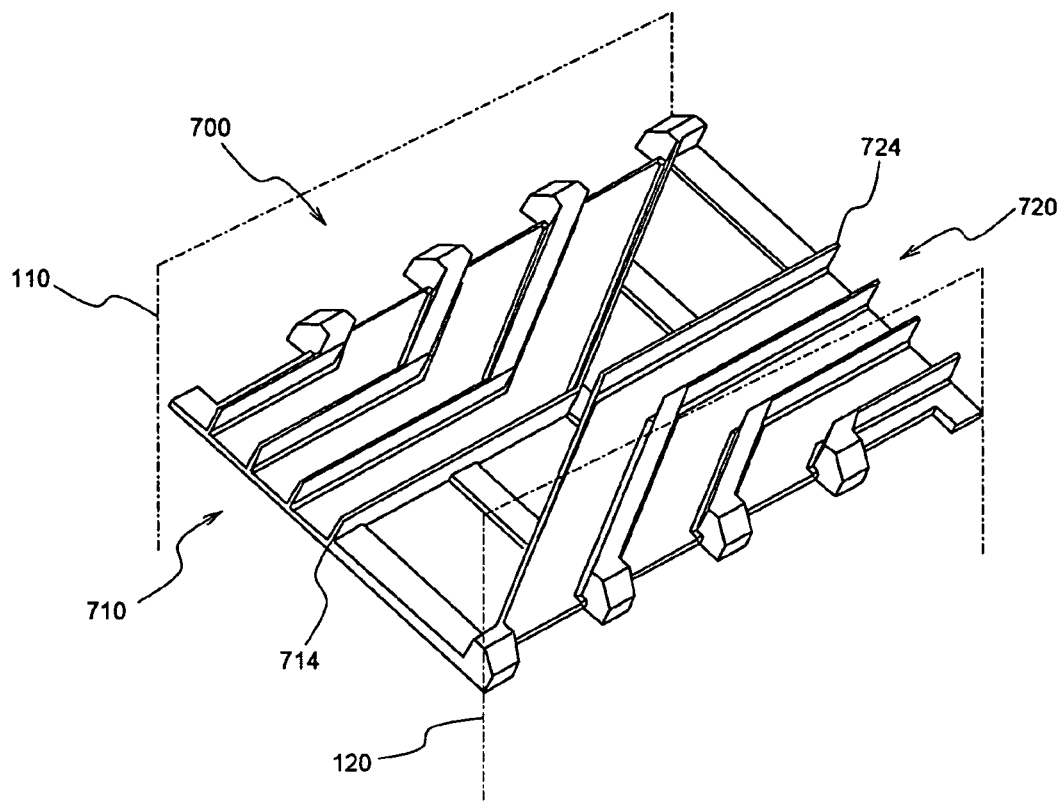
FIG. 3 is a perspective view illustrating a refrigerant guide member according to an alternative embodiment of the present invention, for use with the battery pack cooling system of the present invention.

FIG. 3 illustrates the configuration of a refrigerant guide member according to an alternative embodiment of the present invention.

As shown in FIG. 3, the refrigerant guide member 700 according to the alternative embodiment of the present embodiment includes a refrigerant introduction section 710 and a refrigerant discharge section 720, which have approximately the same refrigerant passages as those of FIG. 2, but are different in the shape of partitions 714 and 724. Specifically, the partitions 714 of the introduction section 710 extend to an inlet (not shown) of the introduction section 710 and are slightly inclined toward the first sidewall 110. Also, the partitions 724 of the discharge section 720 extend to an outlet (not shown) of the discharge section 720 and are slightly inclined toward the second sidewall 120.

It should be understood from the above description that various designs of refrigerant guide members can be used to realize the principle of the present invention, and all of them are included in the scope of the present invention.

Figure 4:
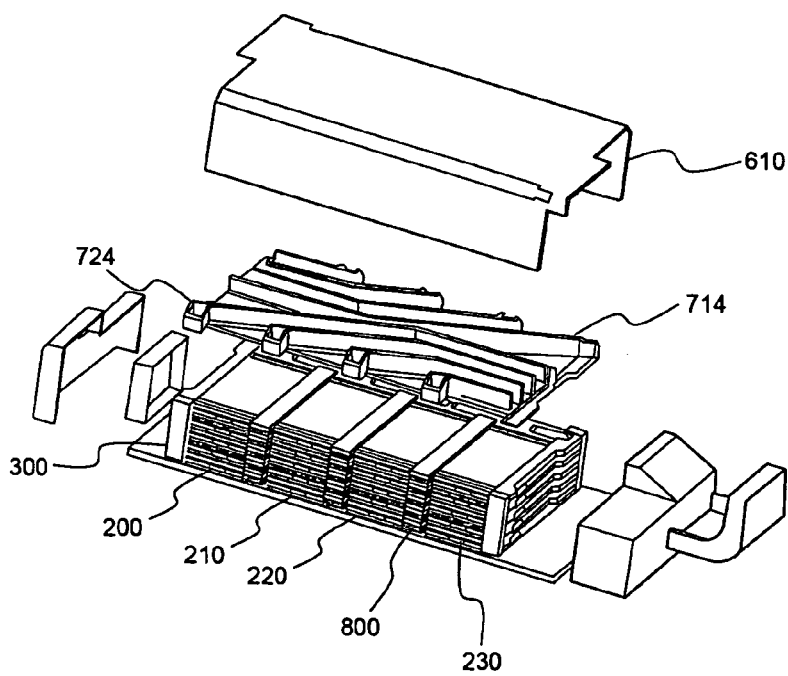
FIG. 4 is an exploded perspective view of the battery pack cooling system according to the present invention, which is mounted at the top of a battery pack.
Figure 5:
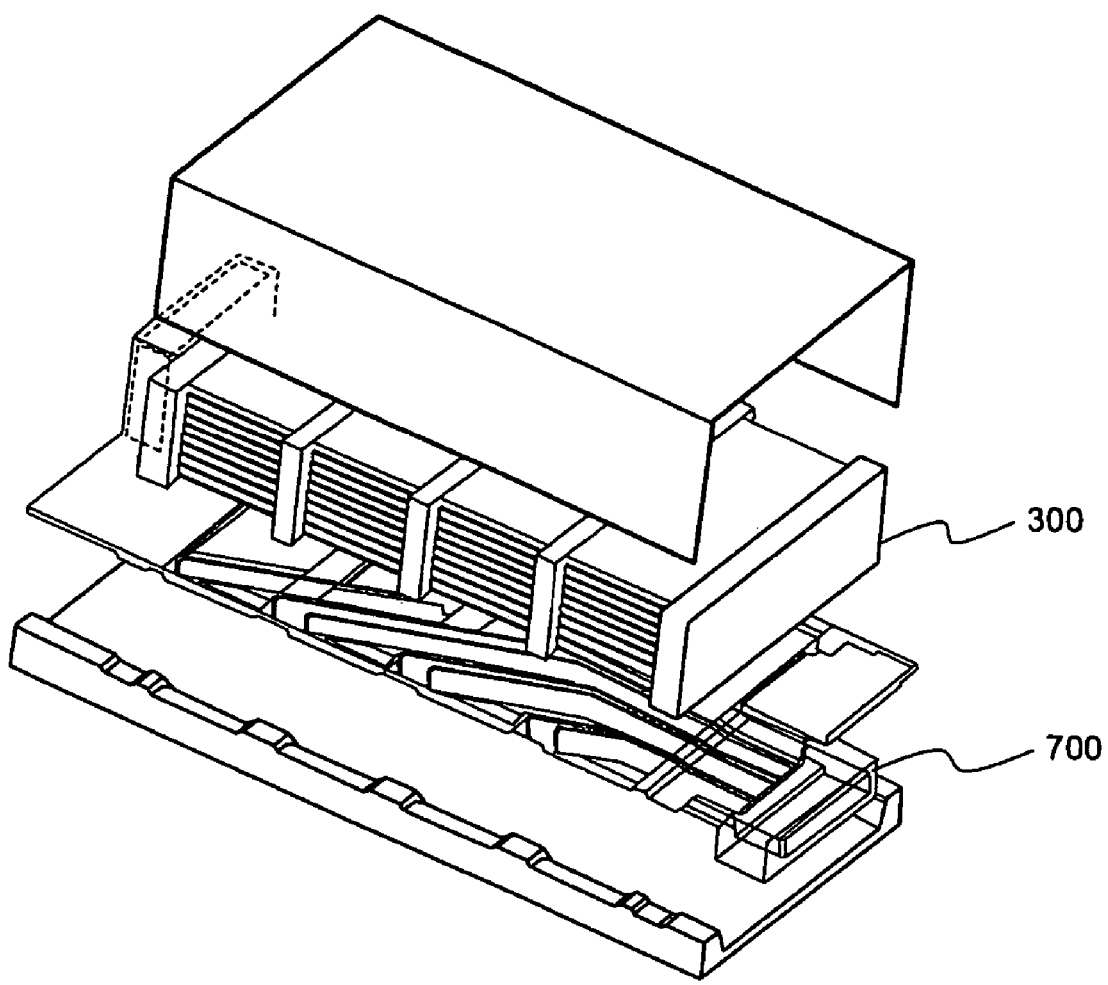
FIG. 5 is an exploded perspective view of the battery pack cooling system according to the present invention, which is mounted at the bottom of a battery pack.

FIGS. 4 and 5 illustrate different battery systems in which the refrigerant guide member of FIG. 3 is arranged at the top or bottom of the battery pack.

Referring to FIG. 4, separator members 800 are interposed between the neighboring battery modules 200, 210, 220, and 230. The separator members 800 protrude from opposite lateral surfaces of the battery pack 300 so that they come into close contact with a case cover 610. Thus, in the case of the battery system as shown in FIG. 4, it is unnecessary that the partitions 714 and 724 extend to the lateral surfaces of the battery pack 300.

Referring to FIG. 5, the refrigerant guide member 700 is mounted at the bottom of the battery pack 300. In this case, the refrigerant moves in reverse as that of FIG. 2.

INDUSTRIAL APPLICABILITY

As apparent from the above description, the present invention has a battery pack cooling system having the following effects.

Firstly, the battery pack cooling system of the present invention is designed to supply a refrigerant to respective battery cells at a constant flow rate, thereby achieving effective dissipation of heat generated from the battery cells. Also, the present invention is able to minimize a temperature difference between the battery cells during a cooling process. This prevents degradation in the performance of the battery cells, thereby enabling optimal temperature control of the battery cells. Furthermore, the present invention employs only one refrigerant guide member arranged at the upper or lower side of a battery pack, resulting in a reduction in the size of an overall battery system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling system for a battery pack having a plurality of battery modules, the cooling system comprising:
   a refrigerant guide member disposed at one of an upper side of the battery pack and a lower side of the battery pack, the refrigerant guide member comprising:
      a refrigerant introduction section disposed adjacent to a first sidewall of the battery pack, the refrigerant introduction section having an inlet and including partitions which separate adjacent battery modules of the plurality of battery modules; and
      a refrigerant discharge section disposed adjacent to a second sidewall of the battery pack, opposite the first sidewall of the battery pack, the refrigerant discharge section having an outlet;
   first refrigerant passages in fluid communication with the inlet and which extend through the first sidewall;
   second refrigerant passages defined by gaps between adjacent battery cells of the battery modules, the second refrigerant passages in fluid communication with the first refrigerant passages; and third refrigerant passages which extend through the second sidewall and which are in fluid communication with the outlet.

2. The cooling system as set forth in claim 1, wherein each of the battery modules consists of a plurality of battery cells, and wherein the battery cells are lithium ion secondary batteries, lithium ion polymer secondary batteries, or nickel metal hybrid batteries.

3. The cooling system as set forth in claim 1, wherein the refrigerant is air.

4. The cooling system as set forth in claim 1, wherein the refrigerant discharge section comprises partitions which separate adjacent battery modules of the plurality of battery modules.

5. The cooling system as set forth in claim 1, wherein the refrigerant guide member is disposed at the upper side of the battery pack.

6. The cooling system as set forth in claim 1, wherein the cooling system is used in a battery system that serves as a power source of electric vehicles or hybrid electric vehicles.

7. The cooling system as set forth in claim 6, wherein the cooling system is used in the battery system that serves as a power source of hybrid electric vehicles.

* * * * *